US011567433B2

(12) United States Patent
Nakamura

(10) Patent No.: US 11,567,433 B2
(45) Date of Patent: Jan. 31, 2023

(54) BELT CONVEYANCE DEVICE WITH A MEANDERING CORRECTION PART SHIFTING ONE END OF A TENSION ROLLER AND AN ADJUSTMENT PART SHIFTING THE OTHER END

(71) Applicant: KYOCERA Document Solutions Inc., Osaka (JP)

(72) Inventor: Satoru Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/215,424

(22) Filed: Mar. 29, 2021

(65) Prior Publication Data
US 2021/0311419 A1    Oct. 7, 2021

(30) Foreign Application Priority Data
Apr. 3, 2020  (JP) .............................. JP2020-067598

(51) Int. Cl.
| G03G 15/16 | (2006.01) |
| B65G 23/44 | (2006.01) |
| B65G 15/60 | (2006.01) |
| G03G 15/00 | (2006.01) |
| G03G 21/16 | (2006.01) |

(52) U.S. Cl.
CPC ......... *G03G 15/1615* (2013.01); *B65G 15/60* (2013.01); *B65G 23/44* (2013.01); *G03G 15/165* (2013.01); *G03G 15/754* (2013.01); *G03G 15/755* (2013.01); *G03G 21/168* (2013.01); *G03G 2215/00143* (2013.01); *G03G 2215/00561* (2013.01); *G03G 2215/00565* (2013.01); *G03G 2215/1623* (2013.01)

(58) Field of Classification Search
CPC ............. G03G 15/1615; G03G 15/165; G03G 15/754; G03G 15/755; G03G 21/168; G03G 2215/00143; G03G 2215/00561; G03G 2215/00565; G03G 2215/1623; G03G 2221/1623; B65G 15/60; B65G 23/44
See application file for complete search history.

(56) References Cited

U.S. PATENT DOCUMENTS

| 10,031,447 | B2 * | 7/2018 | Tsukijima | .......... G03G 15/1615 |
| 10,067,446 | B1 * | 9/2018 | Kitada | ................. G03G 15/161 |
| 2012/0027461 | A1 * | 2/2012 | Murai | ................. G03G 15/168 |
| | | | | 399/121 |

FOREIGN PATENT DOCUMENTS

JP    2002-296972 A    10/2002

* cited by examiner

*Primary Examiner* — Joseph S Wong
(74) *Attorney, Agent, or Firm* — Studebaker & Brackett PC

(57) ABSTRACT

The belt conveyance device includes a plurality of rollers, a belt, a meandering correction part, and an adjustment part. The rollers are disposed at intervals each other and rotate around axes. The belt is disposed around the plurality of rollers and travels. The meandering correction part shifts one end portion in an axial direction of a tension roller included in the plurality of rollers in a radial direction within a predetermined range to correct a meandering of the belt. The adjustment part shifts the other end portion in the axial direction of the tension roller in the radial direction such that a position of the one end portion of the tension roller is variable under a state where the meandering of the belt is corrected.

7 Claims, 7 Drawing Sheets

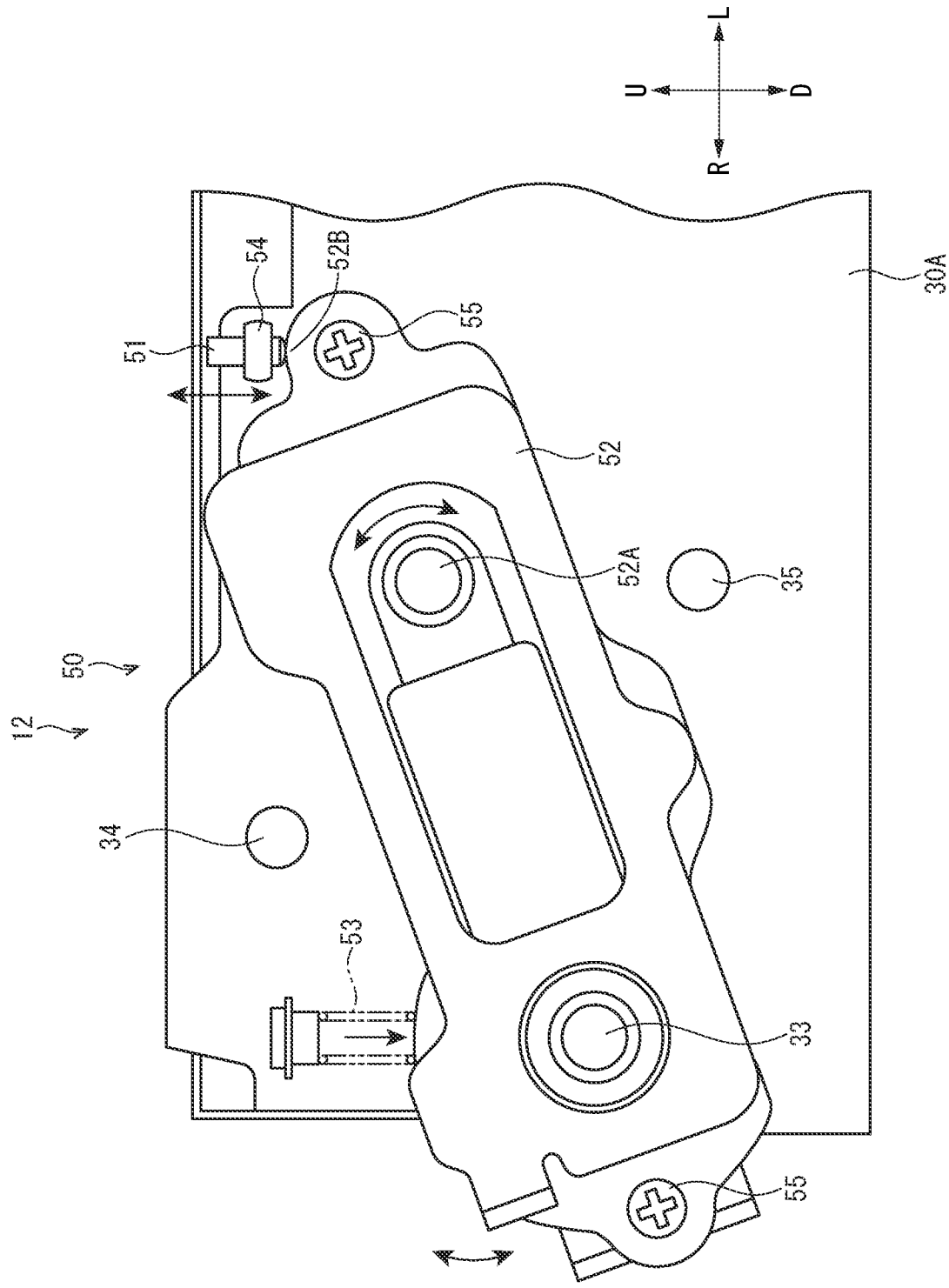

BELT CONVEYANCE DEVICE WITH A MEANDERING CORRECTION PART SHIFTING ONE END OF A TENSION ROLLER AND AN ADJUSTMENT PART SHIFTING THE OTHER END

INCORPORATION BY REFERENCE

This application is based on and claims the benefit of priority from Japanese patent application No. 2020-067598 filed on Apr. 3, 2020, which is incorporated by reference in its entirety.

BACKGROUND

The present disclosure relates to a belt conveyance device and an image forming apparatus.

A belt conveyance device is known, in which a meandering of a belt is corrected by difference in load between left and right belt tension applying rollers around which the belt is wound by 90 degrees or more.

A tendency of the belt meandering is different owing to dimensional tolerance of members of the belt conveyance device and displacement of the members at a time of assembling. Then, when the belt meandering of the plurality of belt conveyance devices is corrected, the meandering correction may be performed in a state where the load is biased to the right side, or the meandering correction may be performed in a state where the load is biased to the left side. Also, there is a limit (a range) to the load exerted for the meandering correction. For example, in a case where the meandering correction is performed in the state where the load is biased to the right side and it is desired to correct the meandering of the belt again by applying the load further to the right side at a later maintenance, there is a possibility that the load cannot be shifted to the right side depending on the situation of the previous meandering correction. That is, in a state where the meandering correction is performed under the situation where the load is shifted to the right side, since the shift range of the load to the right side is narrow, the load sifting necessary for the re-correction may not be performed. As described above, it is ideal that the meandering correction is achieved substantially in a center of a correctable range.

SUMMARY

In accordance with an aspect of the present disclosure, a belt conveyance device includes a plurality of rollers, a belt, a meandering correction part, and an adjustment part. The rollers are disposed at intervals each other and rotate around axes. The belt is disposed around the plurality of rollers and travels. The meandering correction part shifts one end portion in an axial direction of a tension roller included in the plurality of rollers in a radial direction within a predetermined range to correct a meandering of the belt. The adjustment part shifts the other end portion in the axial direction of the tension roller in the radial direction such that a position of the one end portion of the tension roller is variable under a state where the meandering of the belt is corrected.

In accordance with one aspect of the present disclosure, an image forming apparatus includes the belt conveyance device.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 7 is a back view showing an adjustment part of the belt conveyance device according to the embodiment of the present disclosure.

DETAILED DESCRIPTION

Hereinafter, with reference to the attached drawings, one embodiment of the present disclosure will be described. "Fr", "Rr", "L", "R", "U" and "D" marked in each figure show "front", "rear", "left", "right", "upper" and "lower", respectively. Although terms indicating direction and position are used in the specification, they are used for convenience of description and are not intended to limit the technical scope of the present disclosure.

Figure 1:
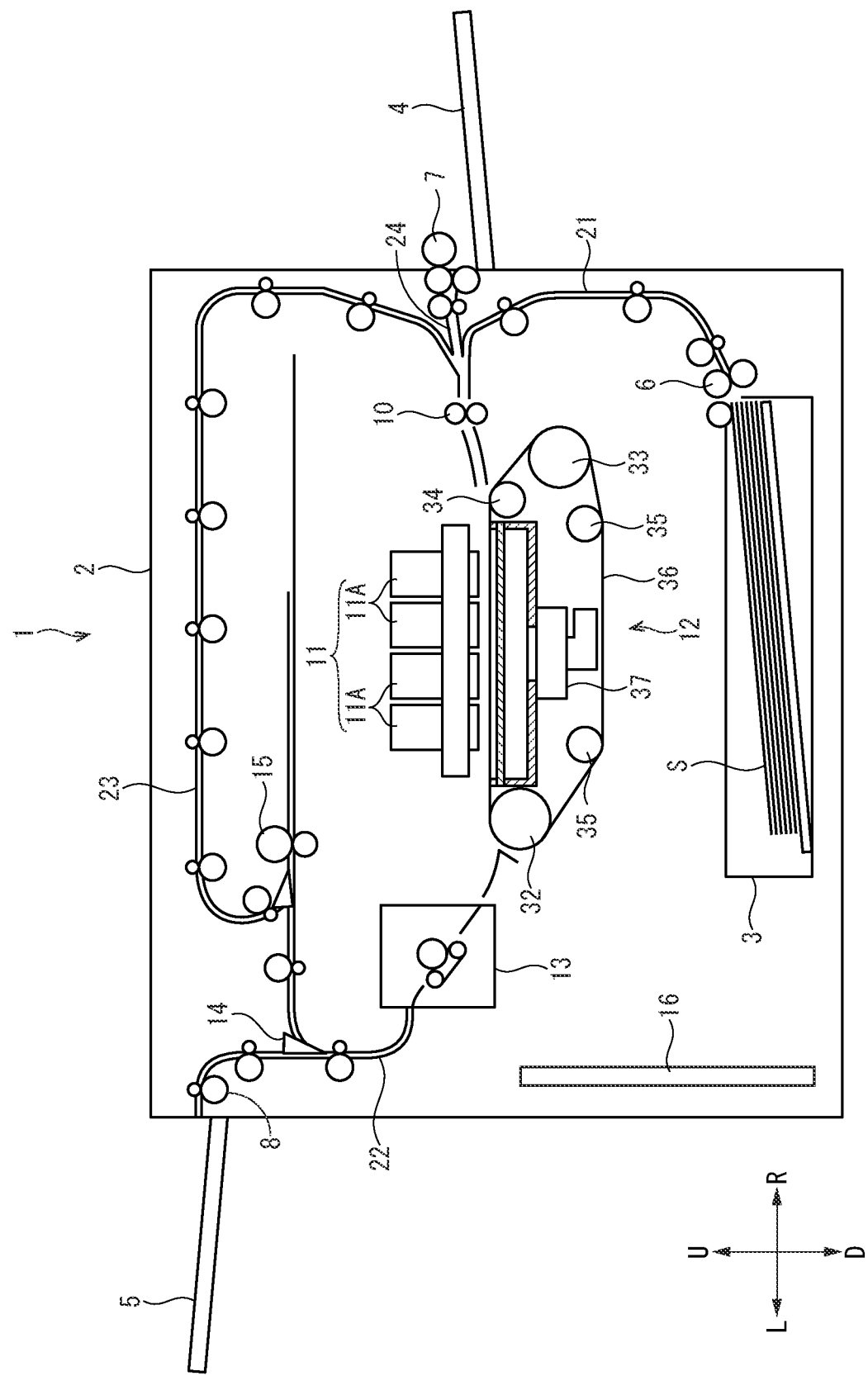
FIG. 1 is a front view schematically showing an inner structure of an image forming apparatus according to one embodiment of the present disclosure.

With reference to FIG. 1, an image forming apparatus 1 will be described. FIG. 1 is a front view schematically showing an inner structure of the image forming apparatus 1.

The image forming apparatus 1 is an inkjet type printer which ejects an ink drop to form an image on a sheet S, and performs printing on one face or both faces of the sheet S. The image forming apparatus 1 includes a box-shaped housing 2 in which various devices are stored. In the lower portion of the housing 2, a sheet feeding cassette 2 in which the sheet S is stored is provided. On the right side face of the housing 2, a manual sheet feeding tray 4 on which the sheet S is placed manually is provided. On the upper left face of the housing 2, a discharge tray 5 on which the printed sheet S is stacked is provided.

In the right side portion of the inside of the housing 2, a first conveyance path 21 is formed to convey the sheet S from the sheet feeding cassette 3 to an image forming part 11 provided in the approximately center portion of the housing 2. On the upstream portion of the first conveyance path 21, a sheet feeding part 6 is provided, and on the downstream portion of the first conveyance path 21, a resist rollers pair 10 is provided. The sheet feeding part 6 has a function of feeding the sheet S from the sheet bundle in the sheet feeding cassette 3. The resist rollers pair 10 has a function of blocking the sheet S conveyed along the first conveyance path 21 temporality to correct a skew of the sheet S. The downstream portion of the first conveyance path 21 is connected to a sheet feeding path 24 extending from the manual sheet feeding tray 4, and on the sheet feeding path 24, a sheet feeding part 7 is provided. The sheet feeding part 7 has a function of feeing the sheet S from the sheet bundle on the manual sheet feeding tray 4.

On the downstream side of the resist rollers pair 10, the image forming part 11 and a belt conveyance device 12 are provided. The image forming part 11 has four line heads 11A which ejects the ink drop. The four line heads 11A correspond to the inks of four colors of black, cyan, magenta and black. The belt conveyance device 12 is provided below the image forming part 11. The belt conveyance device 12 will be described below in detail.

On the downstream side of the belt conveyance device 12, a decurl device 13 for correcting a curl of the sheet S is provided. In the left side portion of the inside of the housing 2, a second conveyance path 22 is formed to convey the sheet S from the decurl device 13 to the discharge tray 5. On the downstream portion of the second conveyance path 22, a discharge part 8 to discharge the printed sheet S to the discharge tray 5 is provided. On the middle portion of the second conveyance path 22, a branch member 14 which switches the discharge direction of the sheet S to the discharge tray 5 and to a third conveyance path 23 described below is provided.

In the upper portion of the inside of the housing 2, the third conveyance path 23 is formed to convey the sheet S from the branch member 14 to the resist rollers pair 10. On the middle of the third conveyance path 23, a sheet inversion part 15 to invert the sheet S upside down is provided. The sheet S conveyed to the third conveyance path 23 is switchbacked on the sheet inversion part 15 to be inverted upside down, and then conveyed to the resist rollers pair 10. Then, the sheet S is conveyed to the image forming part 11 from the resist rollers pair 10 with the back face of the sheet S upward.

The image forming apparatus 1 (the inside of the housing 2) has a control part 16 which controls the various devices suitably. The control part 16 includes a processor which executes various arithmetic processing according to program and parameter stored in a memory. The control part 16 may be achieved by a logic circuit (a hardware) formed on an integral circuit in place of the processer for executing the program.

Figure 2:
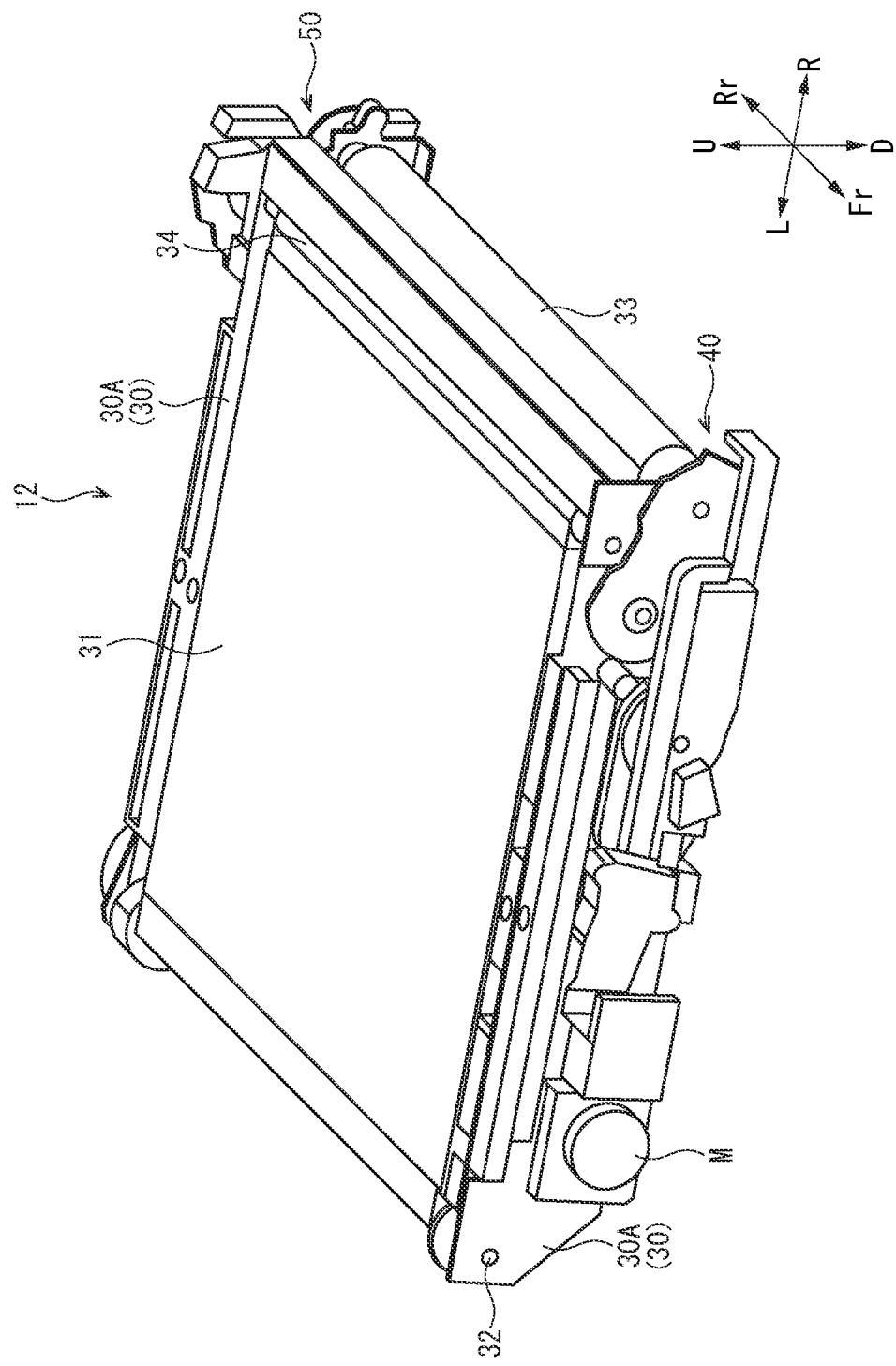
FIG. 2 is a perspective view showing a belt conveyance device according to the embodiment of the present disclosure.

[Belt conveyance device] With reference to FIG. 1 and FIG. 2, the belt conveyance device 12 will be described. FIG. 2 is a perspective view showing the belt conveyance device.

The belt conveyance device 12 includes a conveyance frame 30, a conveyance plate 31, a plurality of rollers 32 to 35, a conveyance belt 36 and a suction part 37. FIG. 2 shows the belt conveyance device 12 in a state where the conveyance belt 36 is removed.

<Conveyance frame> As shown in FIG. 2, the conveyance frame 30 is formed in a frame shape in which bridge frames (not shown) are bridged between main frames 30A disposed via an interval in the front-and-rear direction. Each main frame 30A is made of metal, for example, formed into an approximately rectangular plate, and disposed in an upright posture. The conveyance frame 30 (the belt conveyance device 12) is supported by a lifting and lowering unit (not shown) provided in a liftable and lowerable manner.

<Conveyance plate> The conveyance plate 31 is made of synthetic resin, for example, and formed in an approximately rectangular plate in a plan view. The conveyance plate 31 is disposed between the main frames 30A and fixed to the main frames 30A. The conveyance plate 31 is disposed so as to face the image forming part 11 (the line heads 11A) from the lower side (refer to FIG. 1). The conveyance plate 31 has a plurality of first suction holes (not shown).

<Plurality of rollers> As shown in FIG. 1, the rollers 32 to 35 are disposed via intervals each other between the main frames 30A. Each of the rollers 32 to 35 is formed in a cylindrical shape, and supported by the main frames 30A in a rotatable manner around a rotational axis. Specifically, the plurality of rollers 32 to 35 contains the drive roller 32, the tension roller 33, the speed detection roller 34 and the two idle rollers 35.

The drive roller 32 is disposed in the left upper portion of the conveyance frame 30, and the tension roller 33 is disposed in the right lower portion of the conveyance frame 30. The speed detection roller 34 is disposed in the right upper portion of the conveyance frame 30. The two idle rollers 35 are disposed in the lower portion of the conveyance frame 30 via an interval in the left-and-right direction. The upper portions of the drive roller 32 and the speed detection roller 34 are almost on the same plane as the upper face of the conveyance plate 31. To the drive roller 32, a drive motor M (refer to FIG. 2) is connected via a driving force transmission mechanism such as a gear train (not shown).

<Conveyance belt> The conveyance belt 36 (a belt) is made of synthetic resin, for example, and formed in an endless shape (an annular shape). The conveyance belt 36 is wound around the conveyance plate 31 and the plurality of rollers 32 to 35. The upper face of the conveyance belt 36 forms an approximately horizontal conveyance face with which the sheet S comes into tightly contact. The conveyance belt 36 has a plurality of second suction holes (not shown). When the conveyance motor M is driven to rotate the drive roller 32, the conveyance belt 36 travels while sliding on the upper face of the conveyance plate 31.

<Suction part> The suction part 37 is disposed below the conveyance plate 31 inside the conveyance belt 36. The suction part 37 includes a blower fan (not shown) which generates negative pressure in a space below the conveyance plate 31. The suction part 37 applies the negative pressure on the sheet S on the conveyance belt 36 through the first and second suction holes.

[Image forming processing] With reference to FIG. 1, an image forming processing of the image forming apparatus 1 will be described. The control part 16 controls the various devices suitably to perform the image forming processing as described below.

The sheet feeding parts 6 or 7 convey the sheet S fed from the sheet feeding cassette 3 or the manual sheet feeding tray 4 to the first conveyance path 21 or the sheet feeding path 24. The resist rollers pair 10 blocks the sheet S temporarily before printing to correct the skew, and then conveys the sheet S before printing to the conveyance belt 36 in accordance with the ink drop ejecting timing of the line heads 11A. The sheet S is conveyed together with the conveyance belt 36 while sucked on the conveyance belt 36. The image forming part 11 (the line heads 11A) ejects the ink drop on the sheet S on the traveling conveyance belt 36, and forms a full color image (prints). The printed sheet S is released from the sucking, conveyed to the decual device 13, and the curl of the sheet S is corrected.

When the one-side printing is performed, the branch member 14 opens the second conveyance path 22 while closes the third convenance path 23. The sheet S printed on one face is conveyed along the second conveyance path 22 and then discharged on the discharge tray 5.

When the both-side printing is performed, the branch member 14 closes the second conveyance path 22 while opens the third conveyance path 23. The sheet S printed on one face is conveyed to the third conveyance path 23, inverted upside down through the sheet inversion part 15, and then conveyed to the resist rollers pair 10 again. Thereafter, an image is formed on the back face of the sheet S in the same order as the one-side printing, and the sheet S printed on both faces is conveyed along the second conveyance path 22 and then discharged on the discharge tray 5.

<Meandering correction part> By the way, in the belt conveyance device 12, the conveyance belt 36 may travel while meandering owing to dimensional tolerance of the members of the belt conveyance device 12 and displacement of the members at a time of assembling. The meandering of the conveyance belt 36 is corrected at a time of manufacturing of the image forming apparatus 1 (before shipping from a factory). The belt conveyance device 12 according to present embodiment includes a meandering correction part 40 to correct the meandering of the conveyance belt 36.

Figure 3:
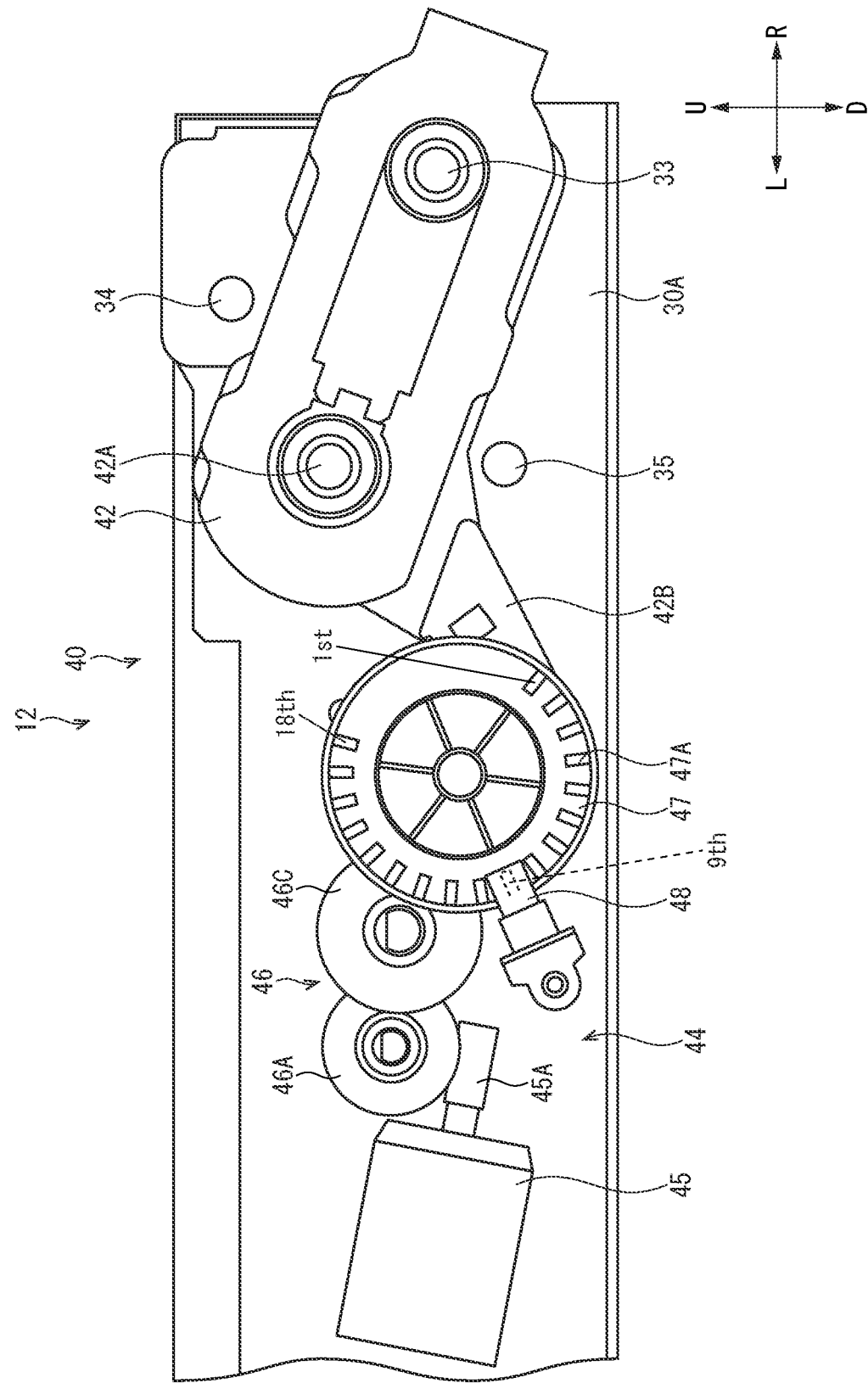
FIG. 3 is a front view showing a meandering correction part of the belt conveyance device according to the embodiment of the present disclosure.
Figure 4:
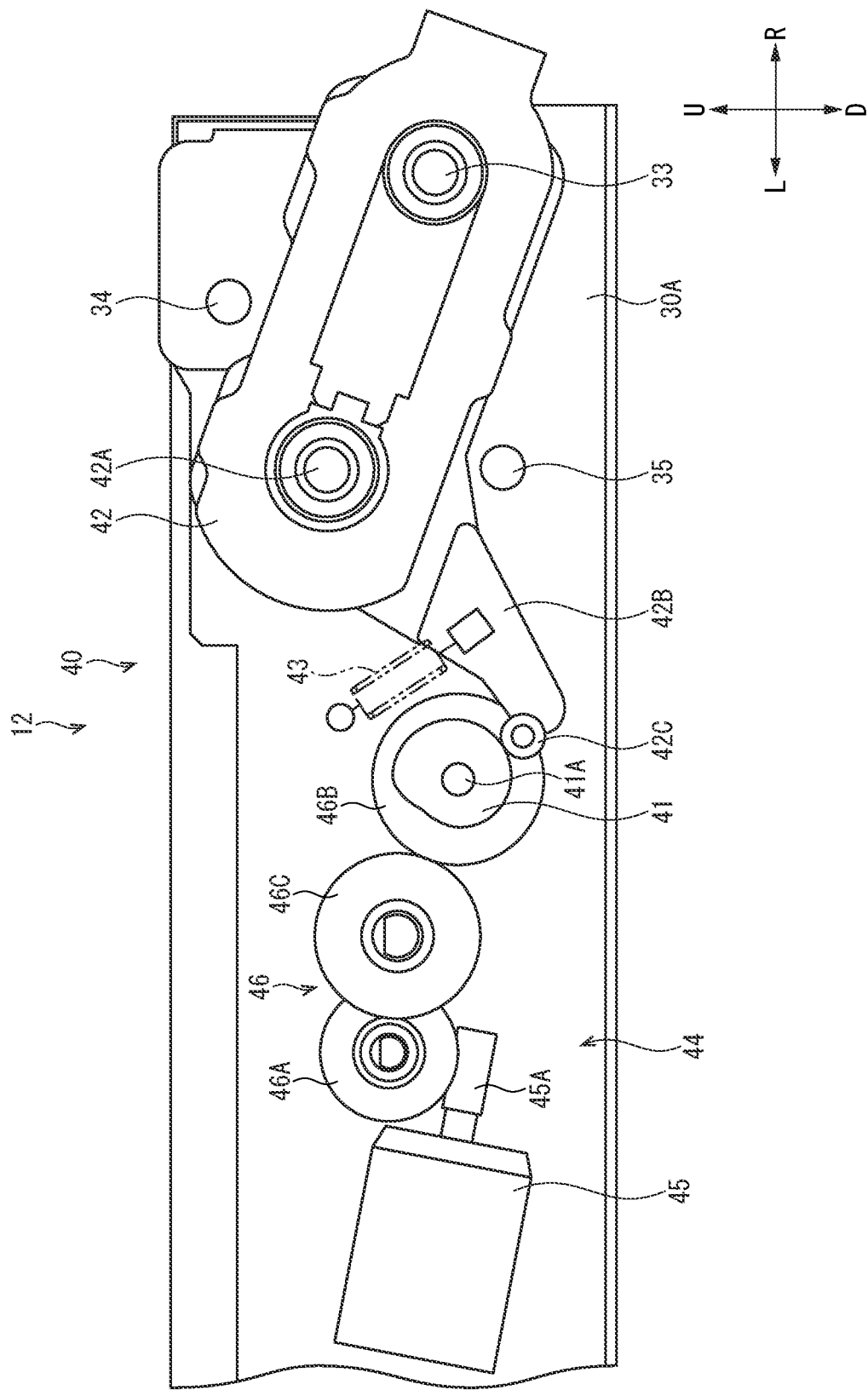
FIG. 4 is a front view showing the meandering correction part (in a state where an angle detection plate and the others are removed) of the belt conveyance device according to the embodiment of the present disclosure.

With reference to FIG. 2 to FIG. 4, the meandering correction part 40 will be described. FIG. 3 is a front view showing the meandering correction part 40. FIG. 4 is a front view showing the meandering correction part 40 (in a state where an angle detection plate 47 and the others are removed).

As shown in FIG. 2, the meandering correction part 40 is provided in the front portion of the belt conveyance device 12. Specifically, the meandering correction part 40 is mounted on the front face of the front main frame 30A. The meandering correction part 40 has a function of correcting the meandering of the conveyance belt 36 by shifting the front end portion (one end portion in an axial direction) of the tension roller 33 in a radial direction within a predetermined range.

As shown in FIG. 3 and FIG. 4, the meandering correction part 40 includes an eccentric cam 41, a correction holder 42, a correction elastic member 43 and a driving part 44.

(Eccentric cam) As shown in FIG. 4, the eccentric cam 41 is made of metal, for example, formed in an approximately circular plate, and provided in a rotatable manner around a cam rotational shaft 41A (around an axis). The eccentric cam 41 is a so-called disk cam in which a distance (an eccentric radius) between the cam rotational shaft 41A and the outer circumferential face is not constant. The cam rotational shaft 41A extends forward from the front face of the main frame 30A in parallel with the tension roller 33. The eccentric cam 41 is formed such that the eccentric radius is decreased (shortened) gradually in the clockwise direction starting from the maximum portion (the uppermost portion in FIG. 4). On the circumferential face of the eccentric cam 41, a step is formed on a boundary between the maximum radius portion and the minimum radius portion.

(Correction holder) As shown in FIG. 3 and FIG. 4, the correction holder 42 is made of metal, for example, and formed in a substantially rectangular plate shape. The correction holder 42 is provided so as to be rotatable (turnable) around a correction rotational shaft 42A (around an axis). The correction rotational shaft 42A extends forward from the front face of the main frame 30A in parallel with the tension roller 33. The correction rotational shaft 42A supports the left portion of the correction holder 42. The right portion of the correction holder 42 supports the front end portion of the tension roller 33 (one end portion in the axial direction) in a rotatable manner. The correction holder 42 is disposed in a posture inclined downward from the left to the right when viewed from the front side. An arm part 42B is formed at the lower left portion of the correction holder 42. The arm part 42B extends obliquely in the left lower direction from the left lower portion of the correction holder 42. At the tip end of the arm part 42B, a cylindrical contact part 42C is fixed, with which the circumferential face of the eccentric cam 41 comes into contact. That is, the eccentric cam 41 comes into contact with the correction holder 42 on an opposite side to the tension roller 33 with respect to the correction rotational shaft 42A, and the correction holder 42 functions as a lever.

(Correction elastic member) As shown in FIG. 4, the correction elastic member 43 is a tension coil spring provided above the arm part 42B, and bridged between the main frame 30A and the arm part 42B. The correction elastic member 43 has a function of pressing the correction holder 42 (its contact part 42C) against the eccentric cam 41 (its circumferential face). The correction elastic member 43 is not limited to a tension coil spring, and may be, for example, a compression coil spring provided on an opposite side to the eccentric cam 41 with respect to the arm part 42B. The correction elastic member 43 is not limited to a coil spring, and may be a leaf spring or an elastic body made of rubber.

(Driving part) As shown in FIG. 3 and FIG. 4, the driving part 44 includes a correction motor 45, a correction gear train 46, an angle detection plate 47, and an angle detection sensor 48.

The correction motor 45 is electrically connected to the control part 16 and a power source, and driven by the control part 16. To an output shaft of the correction motor 45, a worm gear 45A is fixed. The correction gear train 46 includes an input gear 46A, an output gear 46B, and an intermediate gear 46C. These gears 46A to 46C are supported by the main frame 30A in a rotatable manner. The input gear 46A is meshed with the worm gear 45A of the correction motor 45. The output gear 46B is provided coaxially with the cam rotational shaft 41A on the rear side of the eccentric cam 41, and rotated around the cam rotational shaft 41A together with the eccentric cam 41. The intermediate gear 46C is disposed between the input gear 46A and the output gear 46B, and meshed with the gears 46A and 46B.

As shown in FIG. 3, the angle detection plate 47 is formed in a circular plate, provided coaxially with the cam rotational shaft 41A on the front side of the eccentric cam 41, and rotated around the cam rotational shaft 41A together with the eccentric cam 41. The angle detection plate 47 has a plurality of slits 47A via almost equal intervals in the circumferential direction. In the present embodiment, the eighteen slits 47A are formed side by side in the circumferential direction in the angle detection plate 47, for example. A distance between the adjacent slits 47A shows a minimum rotational angle (a minimum correction angle) of the eccentric cam 41, and in the present embodiment, it becomes possible to vary the rotational angle of the eccentric cam 41 at eighteen stages. In the portion facing the step of the eccentric cam 41, the slit 47A is not formed. In the following description, for convenience of explanation, the slit 47A at a position corresponding to the maximum eccentric radius of the eccentric cam 41 is set to the first slit, and the slit 47A at a position corresponding to the minimum eccentric radius of the eccentric cam 41 is set to the eighteenth slit.

The angle detection sensor 48 is an optical sensor in which a light emitted from a light emitting part (not shown) is received by a light reception part (not shown) and then converted into an electric signal. The angle detection sensor 48 is disposed such that the angle detection plate 47 is disposed between the light emitting part and the light reception part. The angle detection sensor 48 detects the presence and the absence of the slit 47A and then detects a rotational angle of the angle detection plate 47 (the eccentric cam 41).

Figure 5:
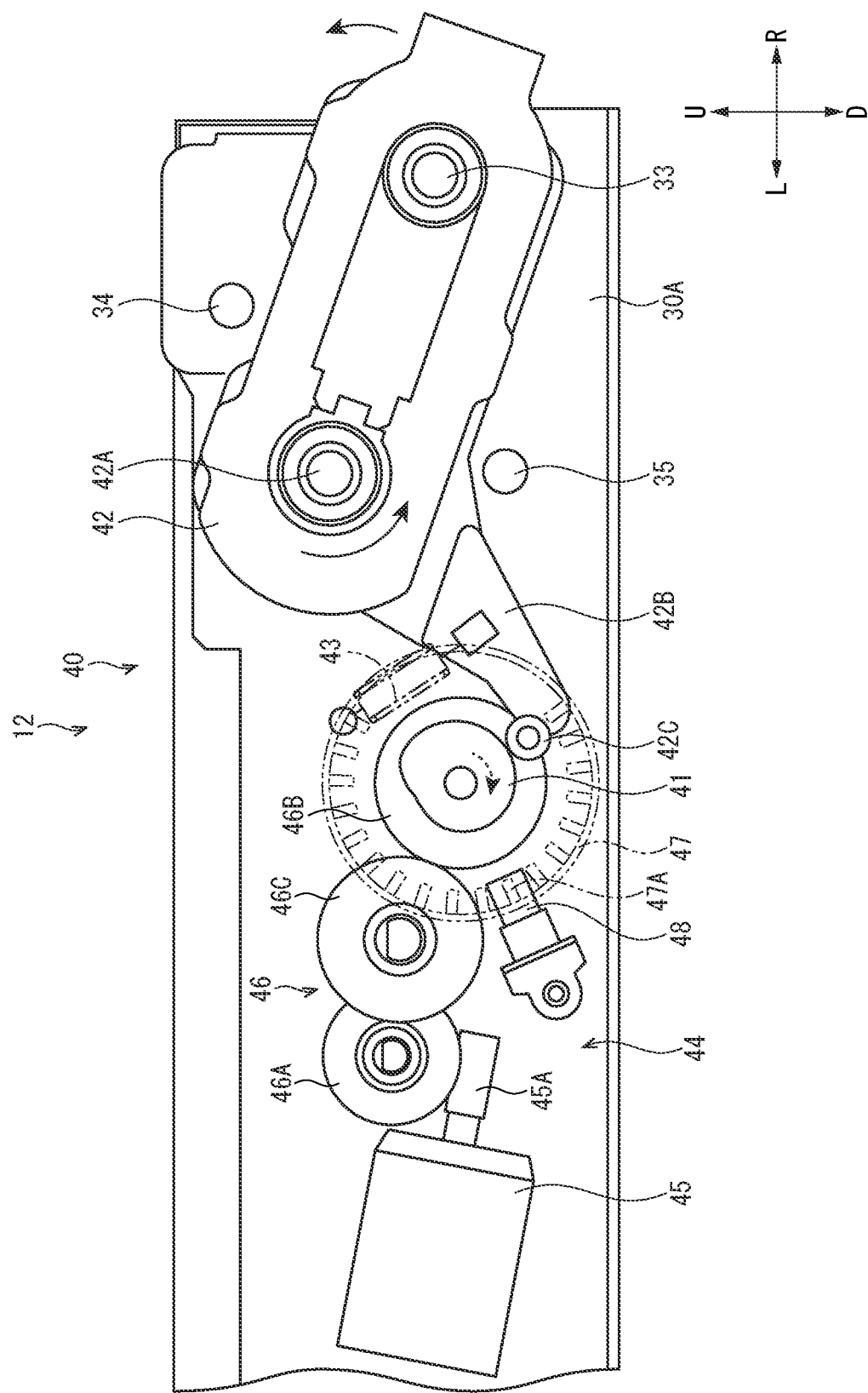
FIG. 5 is a front view explaining an action of the meandering correction part of the belt conveyance device according to the embodiment of the present disclosure.

[Meandering correction of the conveyance belt] Next, with reference to FIG. 3 to FIG. 5, the meandering correction of the conveyance belt 36 by the meandering correction part 40 (hereinafter, called "meandering correction" simply) will be described. FIG. 5 is a front view explaining an action of the meandering correction part 40. For convenience of explanation, it is assumed that the angle detection sensor 48 detects the ninth slit 47A (refer to FIG. 3) and the cam face having an eccentric radius of almost the middle between the maximum eccentric radius and the minimum eccentric radius comes into contact with the contact part 42C (refer to FIG. 4). The memory of the control part 16 stores the data showing that the angle detection sensor 48 detects the ninth slit 47A currently.

An operator operates a control terminal (not shown) connected to the image forming apparatus 1 (the control part 16) or an operation panel (not shown) provided in the image forming apparatus 1 to perform the meandering correction. The operator recognizes the meandering of the conveyance belt 36 by the control terminal while traveling the conveyance belt 36, and operates the control terminal to shift the front end portion of the tension roller 33 so as to suppress the meandering. For example, in a case where the front end portion of the tension roller 33 is shifted in the counterclockwise direction (upward), as shown in FIG. 5, the correction motor 45 is driven until the angle detection sensor 38 detects the eighth slit 47A.

Specifically, the correction motor 45 is controlled by the control part 16 to be driven and then to be rotated. A rotational force of the correction motor 45 (the worm gear 45A) is transmitted to the eccentric cam 41 via the correction gear train 46, and the eccentric cam 41 and the angle detection plate 47 are rotated together in the clockwise direction (refer to the broken line arrow in FIG. 5). The eccentric cam 41 is rotated in a direction in which the eccentric radius increases while coming into contact with the contact part 42C, and the correction holder 42 is turned in the counterclockwise direction (refer to the solid line arrow in FIG. 5) against the biasing force of the correction elastic member 43. The angle detection sensor 48 is switched from a state where the light is received through the ninth slit 47A into a state where the light is not received temporarily. As the angle detection plate 47 is further rotated, the angle detection plate 47 is in a state where the light is received through the eighth slit 47A. When the control part 16 recognizes that the angle detection sensor 38 detects the eighth slit 47A, the control part 16 stops the driving of the correction motor 45. The control part 16 rewrites a data which shows that the angle detection sensor 48 detects the ninth slit 47A to a data which shows that the angle detection sensor 48 detects the eighth slit 47A.

As described above, when the correction holder 42 is rotated in the counterclockwise direction, the front end portion of the tension roller 33 supported by the correction holder 42 is slightly shifted obliquely in the right upper direction, and the meandering of the conveyance belt 36 is corrected. If the meandering is not corrected even when the eccentric cam 41 is rotated by one stage, the above procedure is repeated.

When the front end of the tension roller 33 is shifted in the opposite direction (in the oblique left lower direction), the correction motor 45 may be driven (rotates in the reverse direction) until the angle detection sensor 48 detects the tenth slit 47A. In this case, because the eccentric cam 41 rotates in the direction in which the eccentric radius decreases (in the counterclockwise direction) while coming into contact with the contact part 42C, the correction holder 42 (the tension roller 33) is biased by the correction elastic member 43 and rotates in the clockwise direction.

As described above, by rotating the correction motor 45 in the normal direction and the reverse direction and reciprocating (turning) the eccentric cam 41, the output gear 46B and the angle detection plate 47, it becomes possible to shift the front end portion of the tension roller 33 within a predetermined range. In this embodiment, the predetermined range is a range in which the correction holder 42 can be turned according to the rotation of the eccentric cam 41.

In the above embodiment, the eccentric cam 41 is rotated by one stage, but the present invention is not limited thereto, and the eccentric cam 41 may be rotated by a plurality of stages at one time. In this case, the front end portion of the tension roller 33 is also shifted by a plurality of stages at one time.

<Adjustment part> By the way, because the dimensional tolerance of the members and the positional displacement of the members at the time of assembling are different for each belt conveyance device 12, it is conceivable that the meandering correction is achieved in an extremely biased state depending on the tendency of the meandering of the conveyance belt 36. The exemplary case is a case where the meandering correction is achieved in a state where the angle detection sensor 48 detects the first slit 47A or the eighteenth slit 47A. If the meandering correction is not required again after the meandering correction is performed at the time of manufacturing of the image forming apparatus 1, there is no problem if the meandering correction is performed in the extremely biased state. However, even in the image forming apparatus 1 delivered to a customer, the meandering correction may be required again for some reason such as vibration or aging deterioration. In this case, the operator may perform the maintenance work including the meandering correction.

Figure 6:
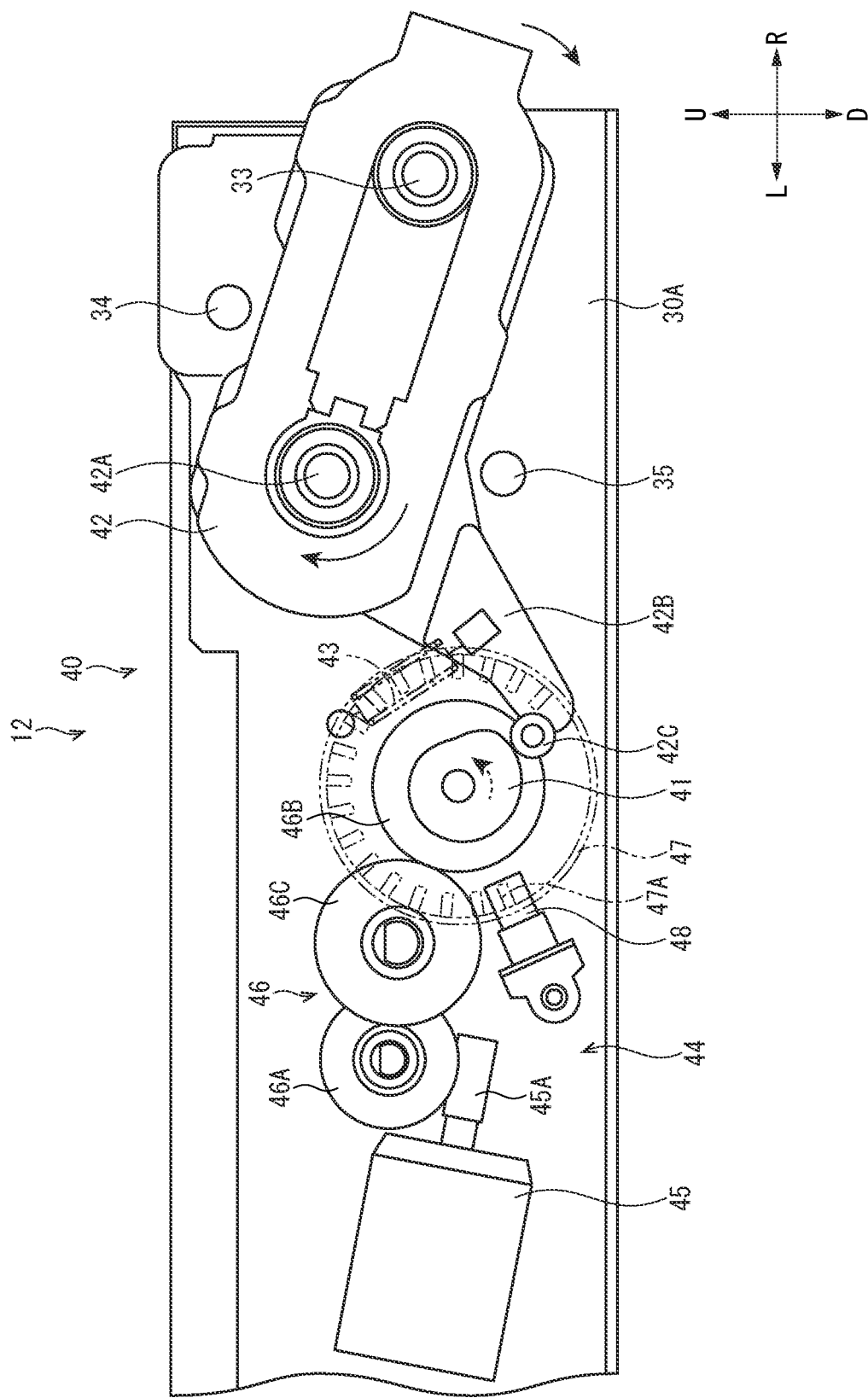
FIG. 6 is a front view explaining the meandering correction part of the belt conveyance device according to the embodiment of the present disclosure, in a state where a meandering correction is achieved under a biased state.

However, since there is a limit to the predetermined range in which the front end portion of the tension roller 33 can be shifted, in the case where the meandering correction is completed in the extremely biased state, it is conceivable that the meandering correction cannot be performed again. For example, as shown in FIG. 6, in a state where the angle detection sensor 48 detects the first slit 47A, because a portion corresponding to the maximum eccentric radius of the eccentric cam 41 comes into contact with the correction holder 42 (the contact part 42C), even if the contact part 42C is to be further pushed by the eccentric cam 41, it cannot be pushed in, and the meandering of the conveyance belt 36 may not be corrected. Therefore, in view of performing the meandering correction again, it is ideal that the meandering correction is achieved substantially in the center of the predetermined range (hereinafter referred to as "a correction range") in which the front end portion of the tension roller 33 is shiftable for the meandering correction. In this embodiment, it is ideal that the meandering correction is achieved in a state where the angle detection sensor 48 detects the ninth or tenth slits 47A. Therefore, the belt conveyance device 12 according to the present embodiment includes an adjustment part 50 for achieving the meandering correction substantially in the center of the correction range. In the following description, it is also referred to as "centering of correction allowance" that the meandering correction is achieved substantially in the center of the correction range.

With reference to FIG. 2 and FIG. 7, the adjustment part 50 will be described. FIG. 7 is a back view showing the adjustment part 50.

As shown in FIG. 2, the adjustment part 50 is provided on the rear portion of the belt conveyance device 12. Specifically, the adjustment part 50 is mounted on the rear face of the rear main frame 30A. The adjustment part 50 has a function of shifting the rear end portion (the other end portion in the axial direction) of the tension roller 33 in the radial direction so as to vary a position of the front end portion (the one end portion in the axial direction) of the tension roller 33 under a state where the meandering of the conveyance belt 36 is corrected.

As shown in FIG. 7, the adjustment part 50 includes an adjustment screw 51, an adjustment holder 52, and an adjustment elastic member 53.

(Adjustment screw) The adjustment screw 51 is as an example of an adjustment advancing/retreating member, and is a male screw screwed with a female screw portion 54 formed in the main frame 30A. The female screw portion 54 is formed in an annular shape, and is provided on the upper portion of the main frame 30A on the left side of the tension roller 33. The adjustment screw 51 is screwed with the female screw portion 54 from the above side, and the lower portion of the adjustment screw 51 penetrates the female screw portion 54. The adjustment screw 51 is provided so as to advance and retreat in the upper-and-lower direction (the radial direction) with respect to the female screw portion 54.

(Adjustment holder) The adjustment holder 52 is made of metal, for example, and is formed in an approximately rectangular plate. The adjustment holder 52 is rotatable (turnable) around an adjustment rotational shaft 52A (around an axis). The adjustment rotational shaft 52A extends rearward from the rear face of the main frame 30A in parallel with the tension roller 33. The adjustment rotational shaft 52A supports the left portion of the adjustment holder 52. The right portion of the adjustment holder 52 supports the rear end portion (the other end portion in the axial direction) of the tension roller 33 in a rotatable manner. The adjustment holder 52 is disposed in a posture inclined downward from the left side to the right side when viewed from the front side. In the left upper portion of the adjustment holder 52, a screw contact part 52B is formed, with which the tip end (the lower end) of the adjustment screw 51 comes into contact. The adjustment screw 51 comes into contact with the adjustment holder 52 on the opposite side to the tension roller 33 with respect to the adjustment rotational shaft 52A, and the adjustment holder 52 functions as a lever. In the left and right end portions of the adjustment holder 52, a pair of through holes (not shown) through which a fixing screw 55 passes are formed. Each fixing screw 55 penetrates the through hole, and is screwed with a fixing thread hole (not shown) of the main frame 30A.

(Adjustment elastic member) The adjustment elastic member 53 is a compressed coil spring provided above the right portion of the adjustment holder 52, and bridged between the main frame 30A and the right upper portion of the adjustment holder 52. The adjustment elastic member 53 functions of pressing the adjustment holder 52 on the adjustment screw 51. The adjustment elastic member 53 is not limited to the compressed coil spring, but may be a tension coil spring provided below the adjustment holder 52, for example. The adjustment elastic member 53 is not limited to a coil spring, but may be a leaf spring or an elastic member made of rubber.

[Centering of correction allowance] Next, with reference to FIG. 7, the centering of correction allowance by the adjustment part 50 will be described. The centering of correction allowance is performed in a case where the meandering correction is achieved at the extremely biased position. Therefore, as a result of the meandering correction, in a case where the angle detection sensor 48 detects the ninth or tenth slit 47A and the cam face having an eccentric radius of substantially the middle between the maximum eccentric radius and the minimum eccentric radius comes into contact with the contact part 42C (refer to FIG. 3 and FIG. 4), it is not required to perform the centering of correction allowance. For convenience of explanation, as shown in FIG. 6, it is assumed that the meandering correction is achieved in a state where the angle detection sensor 48 detects the first slit 47A and the cam face having the maximum eccentric radius comes into contact with the contact part 42C.

The operator performs the centering of correction allowance manually. For example, because the fact that the angle detection sensor 48 detects the first slit 47A shows that the front end portion of the tension roller 33 is disposed at the uppermost position, for the centering of correction allowance, the rear end portion of the tension roller 33 is made to be shifted in the clockwise direction (downward). That is, in the centering of correction allowance, the rear end portion of the tension roller 33 is made to be shifted in an opposite direction to a direction in which the front end portion of the tension roller 33 is shifted in the meandering correction.

The operator removes (or loosens) the pair of fixing screws 55, and rotates the adjustment screw 51 in a direction where the adjustment screw 51 is pulled out upward, using a tool. The adjustment holder 52 is biased by the adjustment elastic member 53 and rotated in the counterclockwise direction while bringing the screw contact part 52B into contact with the tip end of the adjustment screw 51.

As described above, by rotating the adjustment holder 52 in the counterclockwise direction, the rear end portion of the tension roller 33 supported by the adjustment holder 52 is slightly shifted obliquely in the left lower direction. Then, the front end portion of the tension roller 33 is relatively shifted obliquely in the right upper direction, and the meandering of the conveyance belt 36 is generated again.

Next, the operator performs the meandering correction in the above described manner. That is, in order to achieve the meandering correction in the state, the control part 16 controls the correction motor 45 to rotate the eccentric cam 41 in the counterclockwise direction (refer to the broken line arrow in FIG. 6) from the state shown in FIG. 6, and to shift the front end portion of the tension roller 33 obliquely in the left lower direction (refer to the solid line arrow in FIG. 6).

The operator repeats the above described centering of correction allowance and the meandering correction until the angle detection sensor 48 detects the ninth or tenth slit 47A. Then, the meandering of the conveyance belt 36 of the belt conveyance device 12 is corrected in substantially the center within the correction range. After the centering of correction allowance and the meandering correction are completed, the operator fixes the adjustment holder 52 to the main frame 30A by the pair of fixing screws 55.

The belt conveyance device 12 according to the present embodiment described above is configured such that the adjustment part 50 shifts the rear end portion (the other end portion in the axial direction) of the tension roller 33 in the radial direction such that a position of the front end portion (the one end portion in the axial direction) of the tension roller 33 required for achieving the meandering correction of the conveyance belt 36 is variable. According to the configuration, even if the front end portion of the tension roller 33 is disposed in a biased position within the predetermined range after the meandering of the conveyance belt 36 is corrected, it becomes possible to achieve the meandering correction in a state where the end portion in the axial direction of the tension roller 33 is disposed in substantially the center within the predetermined range (the correction range). Therefore, it becomes possible to suppress the biasing of the meandering correction of the conveyance belt 36 and then to re-correct the meandering of the conveyance belt 36.

Further, the belt conveyance device 12 according to the present embodiment is configured such that the adjustment screw 51 (the adjustment advancing/retreating member) advances and retracts while coming into contact with the adjustment holder 52 and then the adjustment holder 52 is turned to shift the rear end portion of the tension roller 33 in the radial direction. According to the configuration, it becomes possible to finely shift the rear end portion of the tension roller 33 and to finely adjust the position at which the meandering correction is achieved at the front end portion of the tension roller 33.

Further, the belt conveyance device 12 according to the present embodiment is configured such that the driving part 44 rotates the eccentric cam 41 while adjusting the angle thereof (stepwise) to turn the correction holder 42, and the front end portion of the tension roller 33 supported by the correction holder 42 is shifted within the predetermined range (the correction range). According to the configuration, depending on the design of the circumferential surface (the cam face) of the eccentric cam 41, it becomes possible to vary a shift amount of the front end portion of the tension roller 33 freely.

In the belt conveyance device 12 according to the present embodiment, the meandering correction part 40 is configured to rotate the front end portion of the tension roller 33 around the correction rotational shaft 42A, but the present invention is not limited thereto, and may be configured to shift the front end portion of the tension roller 33 in the upper-and-lower direction and the left-and-right direction. In the same manner, the adjustment part 50 is configured to turn the rear end portion of the tension roller 33 around the adjustment rotational shaft 52A, but the present disclosure is not limited to this configuration, and may be configured to shift the rear end portion of the tension roller 33 in the upper-and-lower direction and the left-and-right direction.

Further, in the belt conveyance device 12 according to the present embodiment, the meandering correction part 40 is disposed in the front portion of the belt conveyance device 12, and the adjustment part 50 is disposed in the rear portion of the belt conveyance device 12, but the present disclosure is not limited to thereto, and the arrangement of the meandering correction part 40 and the adjustment part 50 may be inverted. That is, the meandering correction part 40 may shift the rear end portion of the tension roller 33 while the adjustment part 50 may shift the front end portion of the tension roller 33.

Further, in the belt conveyance device 12 according to the present embodiment, the eccentric cam 41 of the meandering correction part 40 is driven by the driving part 44 (the correction motor 45 and the others) to be rotated, but the present disclosure is not limited thereto. The driving part 44 may be omitted, and the eccentric cam 41 may be manually rotated. Further, although the correction holder 42 is turned by the cam mechanism including the eccentric cam 41, the present disclosure is not limited thereto. For example, a solenoid capable of moving a plunger forward and backward stepwise, a rack-and-pinion, or the like may be employed to turn the correction holder 42. As another example, in the same manner as the adjustment part 50, the correction holder 42 may be turned by screwing and unscrewing the screw.

Further, in the belt conveyance device 12 according to the present embodiment, the angle detection plate 47 of the meandering correction part 40 has the eighteen slits 47A, but the number of slits 47A may be a plural number and may be freely changed. Further, in the meandering correction part 40, the angle detection sensor 48 (the control part 16) detects the slit 47A of the angle detection plate 47 to control the angle of the eccentric cam 41, but it is not limited to this, and an angle of the eccentric cam 41 may be controlled by detecting a portion without the slit 47A (a portion that blocks light).

Further, in the belt conveyance device 12 according to the present embodiment, the meandering correction part 40 is configured to shift the front end portion of the tension roller 33 stepwise, but the present disclosure is not limited thereto. For example, a ball screw mechanism, a linear motor, or the like may be employed to continuously shift the front end portion of the tension roller 33 and hold it at an any position.

Further, in the belt conveyance device 12 according to the present embodiment, the adjustment screw 51 is employed as an example of an adjustment advancing/retreating member, but the present disclosure is not limited thereto. As another example of the adjustment advancing/retreating member, a solenoid capable of advancing/retreating a plunger stepwise, a rack-and-pinion or the like may be employed to turn the adjustment holder 52 (the rear end portion of the tension roller 33). As another example of the adjustment advancing/retreating member, a cam mechanism may be employed in the same manner as the meandering correction part 40. The adjustment screw 51 may be rotated by a motor or the like.

Further, in the belt conveyance device 12 according to the present embodiment, the adjustment screw 51 is provided so as to advance and retreat in the upper-and-lower direction, but this is not limited to this, and it may be provided so as to advance and retreat in the left-and-right direction or obliquely.

Further, in the belt conveyance device 12 according to the present embodiment, the adjustment part 50 is configured to shift the rear end portion of the tension roller 33 continuously, but the adjustment part 50 may be configured to shift the rear end portion of the tension roller 33 in the same stepwise manner as in the meandering correcting portion 40.

Further, the belt conveyance device 12 according to the present embodiment is controlled by the control part 16 provided in the image forming apparatus 1, but the control part 16 may be regarded as a configuration of the belt conveyance device 12. In addition to the control part 16, a dedicated control part for controlling the belt conveyance device 12 may be provided.

Further, in the present embodiment, the present disclosure is applied to the belt conveyance device 12 for conveying the sheet S in the inkjet type image forming apparatus 1, but the present disclosure is not limited thereto, and may be applied to, for example, a transferring device including a transferring belt mounted on an electrophotographic type image forming apparatus, a fixing device including a fixing belt, etc.

While the embodiments of the present disclosure have been described, the embodiments are shown by way of example and are not intended to limit the scope of the disclosure.

The invention claimed is:

1. A belt conveyance device comprising:
   a plurality of rollers disposed at intervals from each other and rotating around axes;
   a belt disposed around the plurality of rollers and traveling;
   a meandering correction part which shifts one end portion in an axial direction of a tension roller included in the plurality of rollers in a radial direction within a predetermined range to correct a meandering of the belt;
   an adjustment part which shifts the other end portion in the axial direction of the tension roller, which is an opposite end portion to the one end portion, in the radial direction; and
   a control part controlling the plurality of rollers, the belt and the meandering correction part, wherein
   the one end portion of the tension roller is automatically shifted in the radial direction by the meandering correction part controlled by the control part, and
   the other end portion of the tension roller is shifted in the radial direction by the adjustment part operated manually.

2. The belt conveyance device according to claim 1, wherein
   the adjustment part includes:
   an adjustment advancing/retreating member provided so as to be capable of advancing and retreating in the radial direction;
   an adjustment holder provided so as to be turnable around an axis in parallel with the tension roller and supporting the other end portion of the tension roller in a rotatable manner; and
   an adjustment elastic member pressing the adjustment holder on the adjustment advancing/retreating member, wherein
   the adjustment advancing/retreating member advances or retreats while coming into contact with the adjustment holder such that the adjustment holder is turned to shift the other end portion of the tension roller in the radial direction.

3. The belt conveyance device according to claim 1, wherein
   the meandering correction part includes:
   an eccentric cam provided so as to be rotatable around an axis in parallel with the tension roller;
   a correction holder provided so as to be turnable around an axis in parallel with the tension roller and supporting the one end portion of the tension roller in a rotatable manner;
   a correction elastic member pressing the correction holder on the eccentric cam; and
   a driving part which rotates the eccentric cam while adjusting an angle to turn the correction holder and to shift the one end portion of the tension roller supported by the correction holder within the predetermined range.

4. The belt conveyance device according to claim 2, wherein
   the adjustment advancing/retreating member is an adjustment screw screwed with a main frame which supports the plurality of rollers in a rotatable manner.

5. The belt convenance device according to claim 4, wherein
   the adjustment screw is rotated by a motor.

6. An image forming apparatus, comprising the belt conveyance device according to claim 1.

7. The belt conveyance device according to claim 1, wherein
   the adjustment part further includes a fixing member which can fix or activate the adjustment part, wherein
   when the fixing member fixes the adjustment part, the adjustment part is prevented from shifting the other end portion of the tension roller in the radial direction, and
   when the fixing member activates the adjustment part, the adjustment part is allowed to shift the other end portion of the tension roller in the radial direction.

* * * * *